Jan. 12, 1943. R. D. CLEMSON 2,308,354
HACK SAW FRAME
Filed June 27, 1941 2 Sheets-Sheet 1
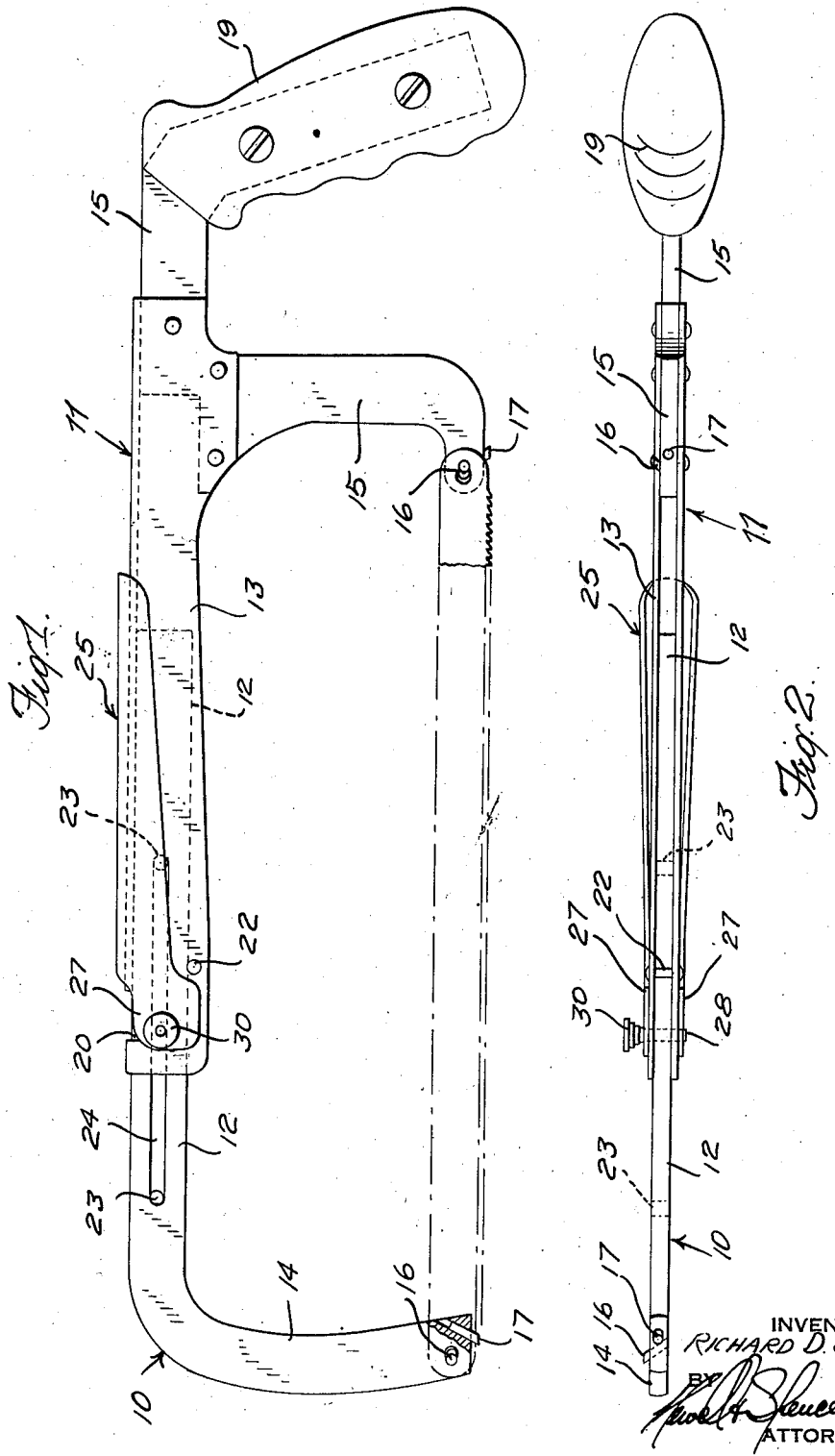
INVENTOR
RICHARD D. CLEMSON
ATTORNEYS

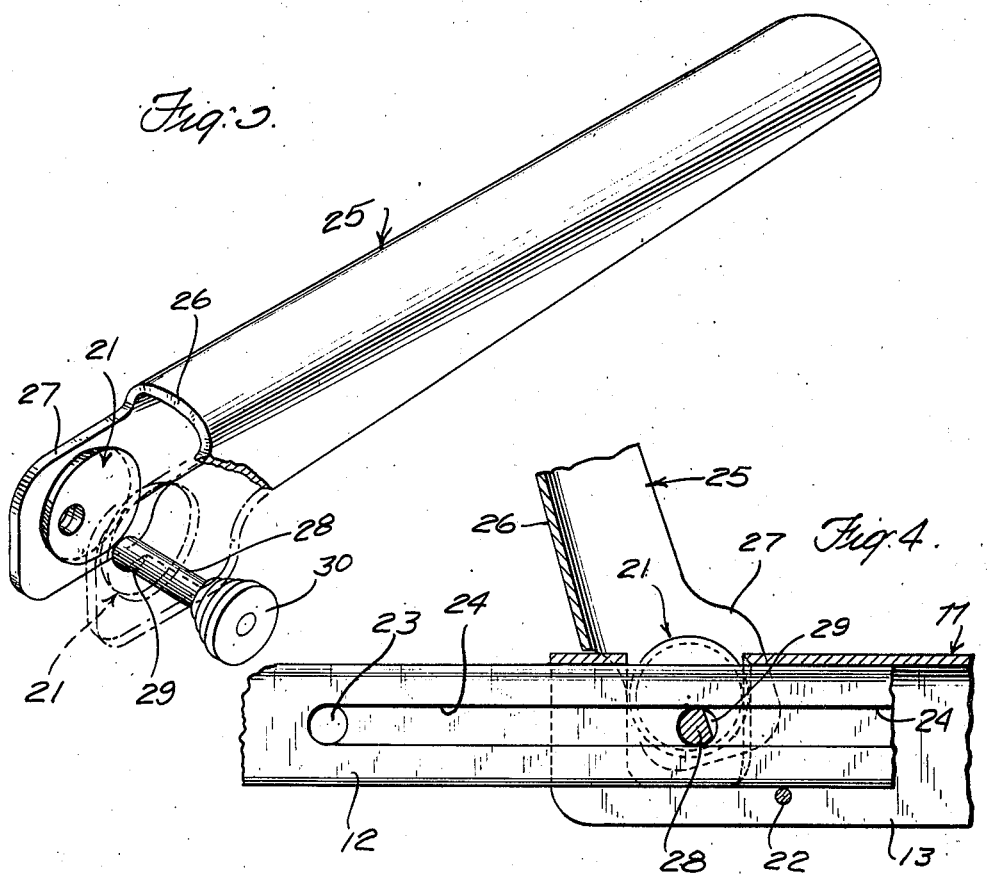

Patented Jan. 12, 1943

2,308,354

UNITED STATES PATENT OFFICE 2,308,354

HACK SAW FRAME

Richard D. Clemson, Middletown, N. Y., assignor to Clemson Bros., Inc., Middletown, N. Y., a corporation of New York Application June 27, 1941, Serial No. 400,045

5 Claims. (Cl. 145—34)

This invention relates to hack saws and particularly to a hack saw frame adapted to receive and tension and quickly interchange standard hack saw blades.

Hack saw blades are made in several standard lengths and the frames in which these blades are used, therefore, are ordinarily adjustable to these several lengths. This adjustment has been accomplished in various ways and most often by use of angular arms interlocked at definite alternative positions by a pin and slot; but in addition to this there has also been the problem of tensioning the blade, since the blade itself is made of thin metal which derives its stiffness from the tension which is imposed upon it by the frame. In practice this tensioning has been attained by a screw threaded device of some kind to which the end of the blade is connected and by which the ends of the frame are sprung toward the ends of the blade with a consequent increase in tension. This arrangement, although it has been used almost universally, is unsatisfactory both in the delay required for changing the blades and in the uncertainty of the final tension imposed upon the blade. As such hack saws are commonly used by highly paid mechanics, the saving in time in the changing of a blade may be an important item of cost, whereas a correct tensioning of the blade will increase its useful life and its effectiveness during such use. It has often been suggested to use cams, gears or various quick operating devices for tensioning blades, but such frames in practice have always failed by inability to hold the required tension.

I have found that this is due in large measure to the use of metals of insufficient stiffness and elasticity. If the metal takes a permanent set it will not again impose full tension, and since the throw of a cam is predetermined and limited it is not feasible to stretch the frame further. On the other hand, if the material is chosen for resiliency to avoid exceeding the elastic limit, it may never reach a sufficient tension within the limited throw of a practicable cam.

It is an object of this invention to provide a hack saw frame which will permit the release, replacement and tensioning of the blade to be done by a simple almost instantaneous operation. It is another object of the invention to provide a saw frame adapted to hold its tension under all normal circumstances.

Another object of the invention is to provide a frame in which the tensioning of the blade is predetermined, so that by simple instantaneous operation requiring no skill the blades can be inserted and tensioned to a predetermined optimum tension which is designed to assure the greatest life and usefulness for the blade.

Another object of the invention is to provide a hack saw frame which will continue to operate rapidly and accurately in spite of hard usage and over long periods of use.

Another object of the invention is to provide a hack saw frame which is readily and conveniently adjustable for different sizes of blades.

Another object of the invention is to provide a hack saw frame which will not fall apart or change its adjustment when the blade is removed, but may be quickly and easily separated if desired or adjusted to a different length of blade.

Other objects and advantages of my invention will be apparent to those skilled in the art from the following description and the accompanying drawings.

Although I have shown in these drawings and described below a preferred embodiment of my invention and have suggested certain modifications thereof, it is to be understood that these are not intended to be exhaustive nor limiting of the invention but on the contrary are chosen and set forth for the purposes of illustration and explanation of the principles thereof in order that others skilled in the art may be enabled to embody the invention in numerous forms and with numerous modifications and adaptations, each as may be best suited to the conditions of a particular use.

In these drawings:

Fig. 1 is a view in side elevation of a hack saw frame embodying my invention and with a saw blade operatively mounted thereon;

Fig. 2 is a plan view taken from the bottom of Fig. 1;

Fig. 3 is a perspective view, partly in phantom, of the lever device used for extending the frame to tension the saw;

Fig. 4 is a fragmentary view, partly in side elevation, partly in longitudinal section, taken on line 4—4 of Fig. 7, of the saw frame with the lever device extended to release the saw blade;

Fig. 5 is a fragmentary view of the same parts but with the section taken along the face of the saw frame on line 5—5 of Fig. 7; so that the lever device is shown in section and with the lever device in operative position for tensioning the saw blade;

Fig. 6 is a cross-section view taken on line 6—6 of Fig. 5; and

Fig. 7 is a fragmentary view in longitudinal section taken on line 7—7 of Fig. 5.

Referring to these drawings, the frame proper is made up of two angularly extending frame members 10 and 11, one arm 12 or 13 of each member being overlapped or telescoped with one arm 13 or 12 of the other, and the other arms 14 and 15 respectively extending more or less perpendicularly to one side. At the ends of each of the arms 14 and 15 are provided pins 16 and 17 driven with a tight fit into suitable holes extending entirely through the ends of the arms 14 and 15 respectively, and thus being well adapted for replacement of the pins 16 or 17 in case of excessive wear by merely inserting a drift punch into the hole and driving the worn pin out and subsequently driving a new pin into the same hole.

In the preferred embodiment of the invention shown in the drawings, the frame member 11 is made of two parts, one of which 13 is of heavy sheet metal folded into a U-section and the other part 15 being a forging of roughly T-shape, one arm of the T being accurately fitted into the channel of the U-member 13 and secured by riveting or welding, the other arm of the T extending into the handle 19 to which it is secured by rivets or bolts or by molding the handle directly onto the metal arm, whereas the base of the T forms the arm 15 to which the saw is attached.

The outer end of the channel arm 13 is slotted or recessed at 20 to receive a cam 21 the structure and functioning of which will be described more in detail below. The open edges of the channel are held together and the channel closed against escape of arm 12 therefrom by a rivet or other transverse member 22. One such member may be used as shown, or several members may be spaced along the channel, but in all cases the distance from the back of the channel should be substantially equal to the width of the arm 12 so that the latter is held snugly against the arm 13.

The arm 12 is drilled with spaced holes 23 at positions chosen, as more fully explained below, to give the frame a length accurately predetermined to receive hack saw blades of standard length and to stretch the blade with a predetermined optimum tension for that particular length when the blade is mounted and tensioned as shown in Figs. 1 and 2. Along one side the arm 12 is grooved with a shallow groove 24 of width equal to the diameter of the holes 23. The end of the arm 12 is received in the channel of the member 13 between its base or back and the rivet 22 and thus these arms are slidably held in parallelism.

A cam member 25 is provided for tensioning the blade. This consists of the lever indicated by the reference character 25 made in channeled form so that when in tensioning position it fits snugly over the outside of the channeled arm 13. The base of the channel 26 of this lever is cut back at one end so as to leave extended fingers 27 to which are secured, e. g., by riveting or welding the eccentrics or other cams 21 already mentioned.

As will be clear from the phantom view of Fig. 3 and the sectional showing of Figs. 6 and 7, the fingers 27 extend beyond the periphery of the cams 21, while the peripheries of these cams are beveled toward the faces of the fingers 27; and the edges of the arm 13 where they are engaged by the cams 21 are correspondingly beveled so that the pressure exerted by the cam against the edges of the arm 13 tends to crowd these edges of the arm 13 into the angles between the cams 21 and the adjacent surfaces of the fingers 27 and thus to prevent the cam and the edges of the arm 13 from slipping apart.

A pin 28 of full width adjacent one end and of reduced width in the portion 29 beyond, and provided at its opposite end with a knob 30, extends through the fingers 27 and through the cams 21 and through one of the holes 23 in the arm 12. Thus the arm 12 is locked to the arm 13 through the cams 21; and thus, by the rotation of the cams 21 by the swinging of the lever 25, the arm 12 may be moved longitudinally with respect to the arm 13 to extend or retract the frame by a distance accurately predetermined by the throw of the cam.

When it is desired to adjust the frame more drastically to receive a different standard length of saw blade this is simply and quickly achieved by merely pulling out the pin 28 by means of the knob 30 until the reduced portion 29 of the pin has passed through the fingers 27 to its end and the full width portion at the end engages and is stopped by the fingers 27 which are fitted to the reduced portion as shown in Fig. 6. When this occurs the full width portion at the end of the pin 28 will have been withdrawn from the one finger 27, the one cam 21 and the hole 23 but will still extend through the other cam 21 and into the slot 24. Consequently the arms, although freely slidable longitudinally within the scope of the slot 24, are held against separation by the engagement of the end of the pin 28 in the slot 24. When the angular members of the frame 12 and 13 have been moved to the desired position for a given length blade, pressure upon the knob 30 will push the pin 28 through another hole 23 and again through the other cam 21 and the other finger 27. Because the groove 24 registers with the holes 23, this is readily achieved without any necessity for finding the hole by jiggling of the pin.

If it should be desired to separate the members 12 and 13, it is only necessary to pull a little more strongly on the knob 30 which, due to the resiliency of the finger 27, will lift the end of the pin 28 sufficiently to come out of the slot 24; or, if the end of the pin 28 is rounded as shown, the arm 12 may be pulled to the limit of the slot 24 and then by a transverse pull on the member 12 it may be pried against the end of the pin 28 so as to spring the finger 27 and push it aside from the slot 24.

The above construction provides for a convenient, simple and fool-proof operation both in the major adjustment to different lengths of saw blades and in the tensioning and release of the blade when a blade is inserted or removed. It is of great importance, however, that with this design the frame members 10, 13 and 15 are made sufficiently heavy and of a metal heat-treated to increase its stiffness and elasticity.

By the use of my invention it is possible to accurately predetermine the tension which will be applied to the saws for each given length. The saw blades themselves as made by the best manufacturers are accurately dimensioned and particularly as to the positioning of the holes in the blade. Thus by the positioning of the holes 23 on the frame and the relationship of the throw of the cams 21 to the stiffness and elastic yield of the frame members, I am able, by the use of my invention, to provide a saw frame which not only is quick and easy to use, but which tensions the blade more accurately and more perfectly adapted for its use than could be done by any except the most skilled workman with an ordinary frame.

It is essential for this result, however, that the frame members be constructed with sufficient strength and of a metal having sufficient stiffness and elasticity so that the desired tension on the blades is reached well within the scope of the throw of the cams and so that the frame does not take a permanent set under the maximum stress to which it will be subjected in use, i. e., the tension applied by the cam plus the maximum push or pull applied to the frame in use. I have found in practice that the frame must be able to withstand a force of 400 and advantageously 500 lbs. between the ends of the arms 14, 15, and to secure this I have found that it is essential to use a heat-treated metal, advantageously a heat-treated steel.

The actual tension which should be exerted on a ten inch blade for hand operation is advantageously about 150 lbs. This may, of course, be very substantially increased in operation by the longitudinal force applied to draw the saw through the kerf and cut the metal. The best tension for manual saws of 8 to 12 inches in length is in general within the range of 150 to 200 lbs. The higher tension should in general be used for the longer saws and the lower tension for the shorter saws and it is an advantage of my invention that the placing of the hole 23 can be accurately determined so that a definite fraction of the scope of operation of the cam 21 and the lever 25 can be utilized at each position thus giving a definitely predetermined optimum tension on any standard blade applied for these lengths and this predetermined tension may thus be made different for each position according to the optimum tension determined for the given length of blade.

What I claim is:

1. A frame for supporting and tensioning a saw blade comprising a bar member having a depending arm for attachment to one end of a saw blade, a channel member also having a depending arm for attachment to the other end of a saw blade, the bar member being telescopically received within the channel member, means connecting the depending side walls of the channel member at a point below the bar so as to hold said walls against spreading, one of the side walls of said channel member being slotted transversely of its long axis, the defining edges of said slot constituting bearing surfaces for cam means, a cam means in said slot engaging the opposite defining edges thereof and acting to displace the respective side wall of the channel member longitudinally, means mounting said cam means for rotation about a fixed point on the neutral axis of said bar member, an operating handle, said cam means being attached to a portion of the operating handle for rotation therewith, and means on said cam means for restraining said cam means against movement along the axis of the mounting means to a position outside of the slot in said channel member.

2. A frame for supporting and tensioning a saw blade comprising, a bar member having a depending arm for attachment to one end of the saw blade, a channel member also having a depending arm for attachment to the other end of the saw blade, the bar member being telescopically received within the channel member, means connecting the depending side walls of the channel member at a point below the bar so as to hold said walls against spreading, one of the side walls of said channel member being slotted transversely of its long axis, the defining edges of said slot constituting a cam bearing surface, the bearing surface nearest the depending arm of the channel member being beveled to slope from the outside to the inside wall of the channel member in a direction toward the depending arm thereof, a cam in said slot engaging the opposite defining edges thereof, said cam being beveled in a direction complementary to the bevel of the slot defining edge, means mounted said cam for rotation about a fixed point on said bar member, and an operating handle, said cam being attached to a portion of the operating handle, whereby said cam will be rotated about a fixed point on said bar member to extend or retract positively the channel member with respect thereto to tension or release a saw blade while the cam will be held against disengagement from the respective cam bearing surface by the complementary bevels.

3. A frame for supporting and tensioning a saw blade comprising a bar member having a depending arm for attachment to one end of a saw blade, a channel member also having a depending arm for attachment to the other end of a saw blade, the bar member being telescopically received within the channel member, means connecting the depending side walls of the channel member at a point below the bar to hold said walls against spreading, the side walls of said channel member being slotted transversely of its long axis at a common point, the defining edges of the slots constituting cam bearing surfaces, at least those bearing surfaces nearest the depending arm of the channel member being beveled to slope from the outside to the inside wall of the channel member in a direction toward the depending arm thereof, a cam in each slot engaging the opposite defining edges thereof, the cams being beveled in a direction complementary to the bevel of the slot defining edges, means mounting said cams for rotation about a fixed point on said bar member, and an operating handle including a portion straddling said channel member and portions extending from the straddling portion on either side of the channel member, one of the cams being attached to each of the extending portions, whereby upon movement of the operating handle the cams will be rotated about a fixed point on said bar member to extend or retract positively the channel member with respect thereto to tension or release a saw blade while the extending portions of the operating handle will be held against spreading by the complementary bevel of the slot defining edges and the cams.

4. A frame for supporting and tensioning a saw blade comprising a bar member having a depending arm for attachment to one end of the saw blade, a channel member also having a depending arm for attachment to the other end of the saw blade, the bar member being telescopically received within the channel member, means connecting the depending side walls of the channel member at a point below the bar member to hold said walls against spreading, the side walls of said channel member being slotted transversely of its long axis at a common point, the defining edges of the slots constituting cam bearing surfaces, an operating handle including a portion straddling said channel member and portions depending from the straddling portion on either side of the channel member, a cam attached to each of the depending portions for rotation therewith, each cam being housed in a slot and engaging the opposite defining edges thereof, said bar member having a centrally disposed groove extending along one side thereof and terminating short of its ends, said bar having holes therethrough at spaced intervals along the groove, and a headed pin having an end portion and a shank portion reduced in cross section with respect to said end portion, said pin passing through apertures in both of said depending portions of the handle, both of the said cams, and one of the holes in said bar, the aperture for the passage of said pin through the depending portion of the handle which overlies the grooved side of said bar being too small to permit passage of the end portion therethrough, whereby, when the pin is in operating position, the cam may be rotated thereabout as an axis fixed with respect to the bar and the frame is adjustable to receive blades of different lengths without disassembly by partial retraction of the pin which will then slide in the groove of the bar between the holes therein.

5. A frame for supporting and tensioning a saw blade comprising a bar member having a depending arm for attachment to one end of the saw blade, a channel member also having a depending arm for attachment to the other end of the saw blade, the bar member being telescopically received within the channel member, means connecting the depending side walls of the channel member at a point below the bar member to hold said walls against spreading, the side walls of said channel member being slotted transversely of its long axis at a common point, the defining edges of the slots constituting cam bearing surfaces, at least those bearing surfaces nearest the depending arm of the channel member being beveled from the outside to the inside wall of the channel member in a direction toward the depending arm thereof, an operating handle including a portion straddling said channel member and resilient portions depending from the straddling portion on either side of the channel member, a cam attached to each of the extending portions for rotation therewith, each cam being housed in a slot and engaging the opposite defining edges thereof, each cam being beveled in a direction complementary to the bevel of the respective slot defining edge, said bar member having a centrally disposed groove extending along one side thereof and terminating short of its ends, said bar having holes therethrough at spaced intervals along the groove, and a headed pin having an end portion and a shank portion reduced in cross section with respect to said end portion, said pin passing through apertures in both of said depending portions of the handle, both of the said cams, and one of the holes in said bar, the aperture for the passage of said pin through the depending portion of the handle which overlies the grooved side of said bar being too small to permit passage of the end portion therethrough, whereby, when the pin is in operating position, the cams may be rotated thereabout as an axis fixed with respect to the bar, yet the frame is adjustable to receive blades of different lengths without disassembly by partial retraction of the pin which can slide in the groove of the bar between the holes therein and the frame is also capable of disassembly by springing the depending portions of the operating handle to permit the end portion of the pin to be forced up and out of the groove at its end, said depending portions of the handle being held against springing in normal operation by the complementary bevel of the cams and the surfaces engaged thereby.

RICHARD D. CLEMSON.

CERTIFICATE OF CORRECTION.

Patent No. 2,308,354.  January 12, 1943.

RICHARD D. CLEMSON.

It is hereby certified that error appears in the printed specification of the above numbered patent requiring correction as follows: Page 3, second column, line 12, claim 2, for "mounted" read --mounting--; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.